Figure 1:
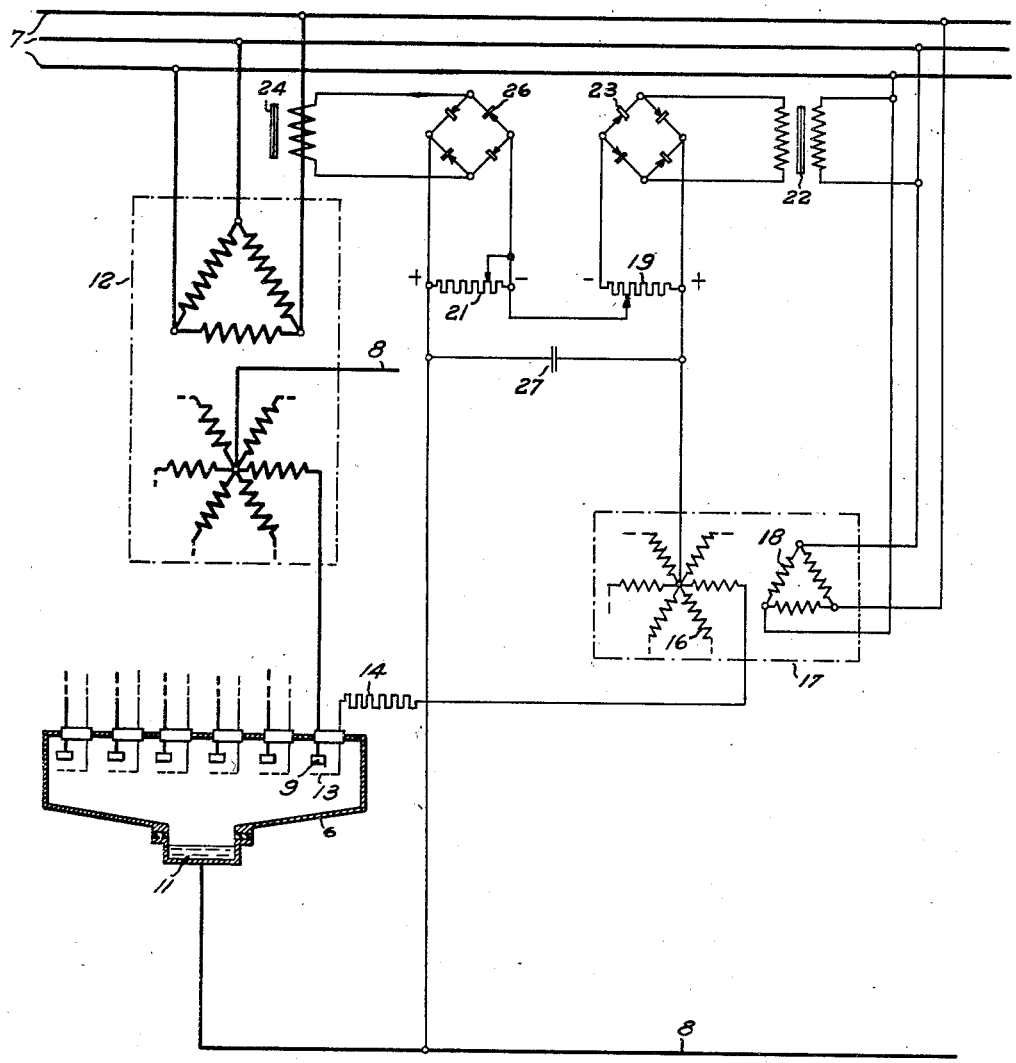

July 4, 1939.   H. WINOGRAD   2,164,792
ELECTRIC VALVE CONTROL SYSTEM
Filed July 1, 1935   3 Sheets-Sheet 2

Inventor
H. Winograd
by
Attorney

July 4, 1939.   H. WINOGRAD   2,164,792
ELECTRIC VALVE CONTROL SYSTEM
Filed July 1, 1935    3 Sheets-Sheet 3

Inventor
H. Winograd
by (signature)
Attorney

Patented July 4, 1939

2,164,792

UNITED STATES PATENT OFFICE 2,164,792

ELECTRIC VALVE CONTROL SYSTEM

Harold Winograd, Milwaukee, Wis., assignor to Allis-Chalmers Manufacturing Company, Milwaukee, Wis., a corporation of Delaware Application July 1, 1935, Serial No. 29,210

11 Claims. (Cl. 175—363)

This invention relates in general to improvements in electric valve control systems, and more particularly to means for controlling the conductivity of an electric valve so utilized in a translating system as to impart a discontinuous output voltage characteristic to such system.

Electric translating systems employing electric valves are generally so designed as to operate at output voltages varying only to a limited extent for a predetermined range of load current, the output voltage characteristic of such system being selected either flat or slightly rising or drooping according to the nature of the load devices supplied by the system. It is also frequently desired to cause such characteristics to become highly drooping for currents above the normal range of load currents, so as to cause the system to transmit current only of such value as may be safely carried thereby. In particular, when current consuming devices supplied with electric current from the translating system have a substantial counter electromotive force, as, for example, arc welding devices, arcing furnaces and storage batteries, the flow of current therethrough is preferably regulated by imparting a highly drooping characteristic to the system for current values approximating rated current thereof. When the translating system supplies current to an extensive supply network for electric traction, such characteristic will cause peak loads to be distributed between such system and other converters or sources connected at the different points of the supply network.

Such characteristic is preferably obtained by controlling the conductivity of the valve or valves utilized in the translating system by control means including means for producing a variable unidirectional voltage responsive to the magnitude of the flow of current through the valves.

It is, therefore, an object of the present invention to provide an electric valve translating system in which the conductivity of the valve is decreased at increasing values of the flow of current therethrough above a predetermined limit.

Another object of the present invention is to provide an electric valve translating system in which the system has imparted thereto an at least partially drooping output voltage characteristic by utilizing a variable unidirectional voltage obtained in response to the magnitude of the flow of current through the valve.

Another object of the present invention is to provide an electric valve translating system in which the system has imparted thereto a discontinuous output voltage characteristic by impressing on the control electrode of the valve unidirectional and alternating potential components, and varying one of such components in response to the magnitude of the flow of current through the valve.

Figure 2:
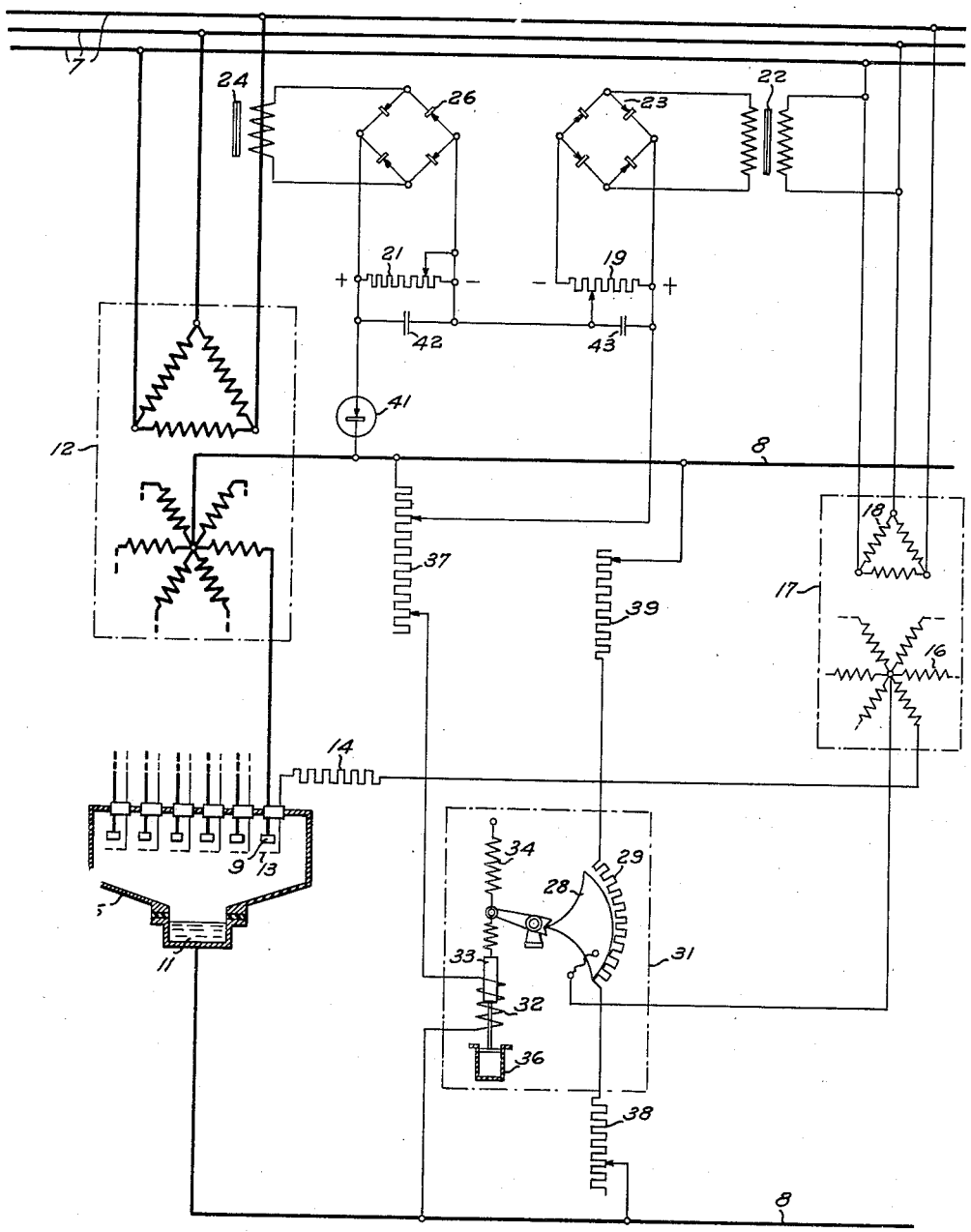
Figure 3:
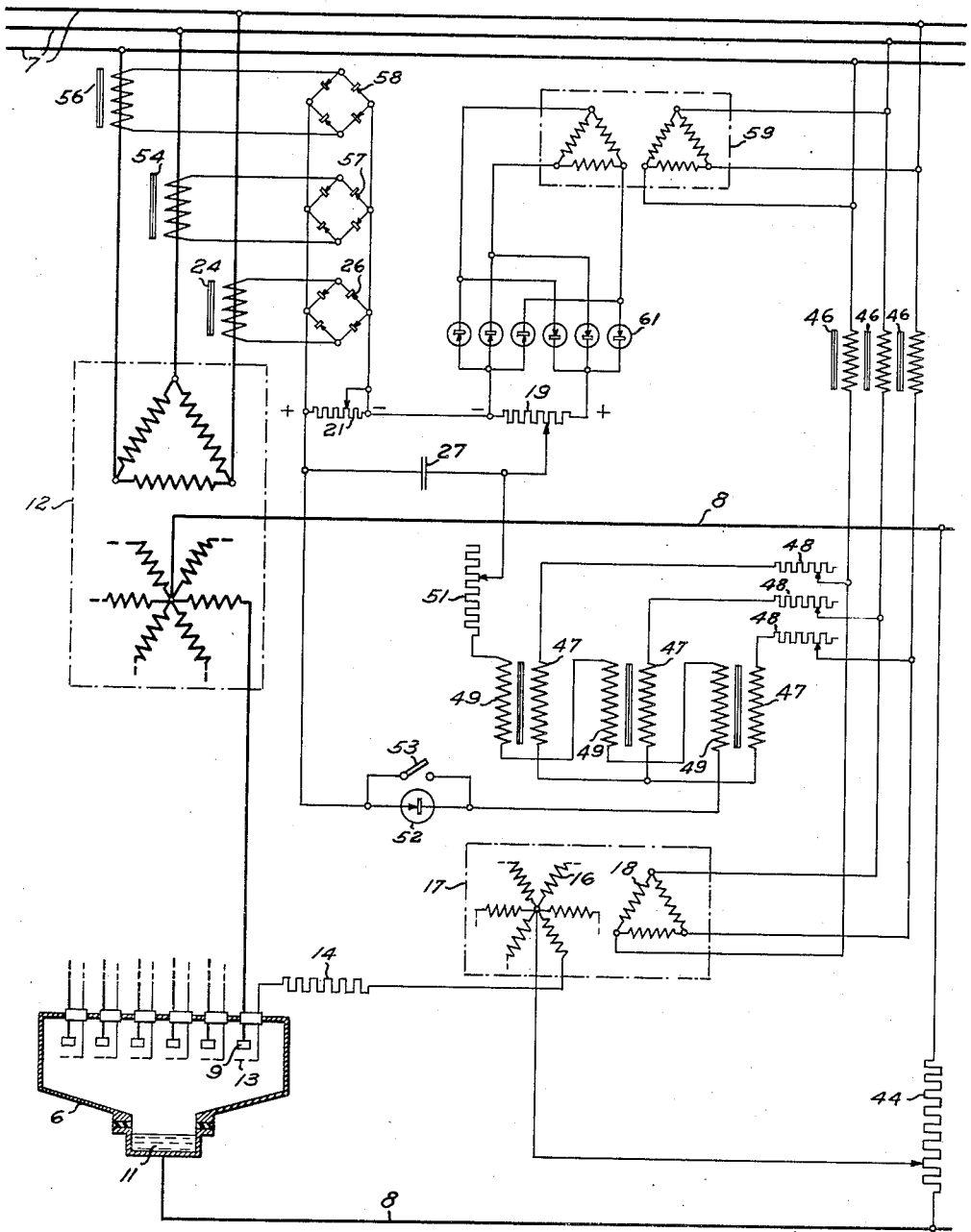

Objects and advantages other than those above described will be apparent from the following description when read in connection with the accompanying drawings, in which:

Fig. 1 diagrammatically illustrates one embodiment of the present invention applied to the control of a valve structure utilized in an alternating current rectifying system, and in which the control electrode circuits of the valve structure receive unidirectional and alternating voltage components of constant value and a variable unidirectional voltage component proportional to the magnitude of the flow of current through the valve structure;

Fig. 2 diagrammatically illustrates a modified embodiment of the present invention, differing from the embodiment illustrated in Fig. 1 in that the variable unidirectional voltage component produced in response to the magnitude of the flow of current through the valve structure is utilized for controlling the operation of a mechanical regulator acting on the conductivity of the valve; and Fig. 3 diagrammatically illustrates another modified embodiment of the present invention, in which the variable unidirectional voltage component is utilized for controlling the energization of a transformer impressing alternating voltage components on the control electrode circuits of the valve structure.

It will be understood that elements shown in any of the figures may also be utilized in combination with elements shown in the other figures to form other embodiments of the invention.

Referring more particularly to the drawings by characters of reference, reference numeral 6 generally designates a valve structure constituting part of a translating system utilized for controlling the flow of energy in either direction between two electric circuits or lines 7 and 8 of different electrical characteristics. The valve structure may be of any of the types known in the art and may consist of a single valve or a plurality of valves, and is herein illustrated as consisting of a so-called rectifier comprising a plurality of valves severally provided with anodes 9, and having the cathodes thereof joined into a single cathode structure 11, but it will be understood that each of the valves may also be provided with a separate cathode enclosed with the associated anode in a separate casing.

Lines 7 and 8 may carry current of any desired form, the translating system being arranged in a suitable manner depending upon the nature of the current to be transmitted therethrough. In the embodiments herein illustrated, line 7 is assumed to be a polyphase alternating current line operating at substantially constant voltage, and line 8 is a direct current line. Line 7 is accordingly connected with anodes 9 through a transformer 12. Assuming that the valves 6 are to transmit energy from line 7 to line 8, cathode 11 is connected with the positive conductor of line 8 and transformer 12 is connected with the negative conductor thereof, as is well known.

The conductivity of valves 6 is controlled by means of control electrodes 13 severally associated with anodes 9, and each connected with cathode 11 through a circuit including suitable voltage sources for impressing on each control electrode suitable potential components referred to the potential of cathode 11 taken as datum. Each such circuit includes a resistor 14 and one of the phase portions of the star connected secondary winding 16 of a transformer 17 having a primary winding 18 and energized from line 7. Such transformer is provided for impressing an alternating potential component on each of the control electrodes 13, and may be so arranged as to deliver sinusoidal voltages or, if preferred, to deliver voltages having a wave form more peaked than the sinusoidal form. In the embodiment illustrated in Fig. 1, the several control electrode circuits are completed by a common portion comprising a pair of serially connected adjustable resistors 19 and 21.

Resistor 19 receives rectified current from line 7 through a transformer 22 and through a group of rectifying devices 23, the connections of such devices being such that the positive terminal of resistor 19 is connected with the neutral point of winding 16, to thereby impress a substantially constant positive potential component on control electrodes 13. Resistor 21 receives a variable rectified current from a current transformer 24, inserted in one of the conductors connecting transformer 12 with line 7, through rectifying devices 26, the connection of such devices being such that the positive terminal of resistor 21 is connected with cathode 11 to thereby impress a variable negative potential component on the control electrodes. As is well known, the positive and negative potential components thus obtained are of an undulatory character, and may be rendered substantially uniform by suitable filtering means such as a capacitor 27 connected across resistors 19 and 21.

In operation, assuming line 7 to be energized by suitable sources (not shown) connected therewith, valves 6 are rendered operative by bringing cathode 11 to the normal electron emitting condition thereof by the usual energizing means, which are well known and therefore not shown. In general, valves 6 are of the discontinuously controllable type in which the conductivity cannot be continuously varied during flow of current through the valves. Transformer 17, resistors 19 and 21 and the associated apparatus then cooperate to control, in time, the periods of presence or absence of conductivity of the several valves and thus control the output voltage of valves 6 impressed on line 8. Such voltage is of average value which is a measure of the conductivity of valves 6, as if such valves were of the continuously controllable type.

Considering the operation of valves 6 more in detail, each anode 9 carries current only when such anode is at a positive potential with respect to the potential of cathode 11, such flow of current being prevented as long as the control electrode associated with the anode is at a potential below the so-called critical potential, which is substantially equal to cathode potential. The flow of current is then released when the control electrode becomes positive with respect to the cathode potential, and generally continues until a flow of current is released through another one of the anodes. It will be observed that, as line 7 operates at substantially constant voltage, resistor 19, rectifying devices 23 and transformer 22 constitute means, other than valves 6, for producing a unidirectional voltage of substantially constant magnitude from input line 7 and are, in effect, a source of substantially constant unidirectional voltage. Such equipment is preferred to other sources of unidirectional voltage such as generators or batteries for the reason that it can operate for indefinite periods of time without requiring any attention. Resistor 21, rectifying devices 26 and current transformer 24 constitute means, other than valves 6, responsive to the magnitude of the flow of current through the valves for producing a variable unidirectional voltage.

As will appear hereinafter, the polarity of resistors 19 and 21 must be those above stated for obtaining the result herein desired, and the characteristic of valves 6 would be entirely different from the desired characteristic if the polarity of one of the resistors or of both thereof were reversed. The particular connection of such resistors herein utilized renders control electrodes 13 responsive to the difference between the magnitudes of the voltages of the resistors.

When valves 6 do not deliver any current to line 8, the voltage across resistor 21 is only the voltage drop produced therein by the flow of current through the several control electrode circuits, and is materially less than the voltage appearing across resistor 19. The phase relation of the secondary winding phase portions of transformers 12 and 17 is so chosen that, under the above load condition, each control electrode either remains continuously positive or becomes positive during each cycle of the voltage of line 7 a material length of time before the associated anodes become positive with respect to the potential of cathode 11. As is well known, the control electrodes then have no action on the conductivity of valves 6, which impresses the maximum possible voltage on line 8.

If valves 6 deliver current to line 8, a unidirectional voltage component of value proportional to the magnitude of the flow of current through the valves appears across the terminals of the resistor 21. When the current through valves 6 remains less than a current of value determined by adjustment of resistors 19 and 21 and herein called transition current, the point of the voltage cycle of line 7, at which any control electrode 13 becomes positive, is delayed at the most to the point at which the associated anode becomes positive, and the control electrodes remain without effect on the conductivity of valves 6. The valves then deliver current under voltages following an inherent characteristic which is, in general, drooping to a slight extent.

If the load current flowing through valves 6 becomes greater than the transition current, the positive energization of the control electrodes is retarded beyond the point of positive energization of the associated anodes, and the control electrodes delay the flow of current through the anodes to thereby decrease the output voltage of the valves and, therefore, decrease the effective conductivity thereof. Such effect increases either linearly or otherwise in proportion to the magnitude of the load current flowing through valves 6, so as to progressively decrease the conductivity of the valves at increasing values of the flow of current therethrough above the value of the transition load; the effect is thus to impart a highly drooping output voltage characteristic to the translating system, i. e., a characteristic which is drooping to a materially greater extent than the inherent characteristic of the system. Under such operating condition, control electrodes 13 are responsive to the sign and magnitude of the differential voltage obtained by differentially connecting resistors 19 and 21, the disturbing effect of any alternating components of such differential voltage being neutralized by capacitor 27, which substantially removes such components of the differential voltage.

In the embodiment illustrated in Fig. 2, the neutral point of winding 16 is connected with a movable tap or sector 28 engaging with a resistor 29 constituting part of a regulator generally designated by 31. Sector 28 is actuated by a solenoid 32 acting on a core 33 against the action of an adjustable spring 34 and under the control of a dashpot 36. The regulator may be rendered responsive to any operating condition of the translating system, and is herein shown as being responsive to the magnitude of the voltage of line 8 by reason of the connection of solenoid 32 across line 8 through an adjusting rheostat 37. The regulator impresses a variable unidirectional potential component on the control electrodes as a result of the connection of resistor 29 across line 8 through adjusting rheostats 38 and 39. Resistors 19 and 21 are herein connected across a portion of rheostat 37 through an auxiliary electric valve 41 for controlling the action of the regulator in response to the magnitude of the flow of current through valve 6 above the transition value. If desired, separate capacitors 42 and 43 may be severally connected across resistors 19 and 21 instead of utilizing a single capacitor 27. The phase relations of transformers 12 and 17 are herein so chosen that the regulator is effective in all positions thereof to delay the positive energization of control electrodes 13 to an extent depending upon the position of sector 28.

In operation, regulator 31 is actuated by solenoid 32 in response to the magnitude of the voltage of line 8 to adjust the position of sector 28 and thus to vary the single unidirectional potential component impressed on all control electrodes 13, such potential component being equal to the voltage drop in rheostat 38 and in the portion of resistor 29 between sector 28 and rheostat 38. When the flow of current through valve 6 remains less than the transition load, the difference between the voltages of resistors 19 and 21 is greater than the voltage of the portion of rheostat 37 bridged by the resistors and is opposed thereto. A flow of circulating current tends to be established from the positive terminal of resistor 19 through such portion of rheostat 37, valve 41 and resistors 21 and 19; such flow, however, being prevented by valve 41. Resistors 19 and 21 are thus without influence on the flow of current in rheostat 37. If solenoid 32 is arranged to act uniformly on core 33 at all points of the stroke thereof, regulator 31 will so control the control electrodes 13 as to maintain the voltage of line 8 at a substantially constant value, thus imparting to the system a flat output voltage characteristic.

When the load current through valves 6 becomes greater than the transition load, the voltage of resistor 21 becomes of sufficient magnitude to decrease the differential voltage of the resistors below the value of the voltage appearing in the portion of rheostat 37 bridged by the resistors. A portion of the flow of current through rheostat 37 is then diverted through resistors 19 and 21 and through rectifier 41, and the flow of current through the portion of the rheostat bridged by the resistors may even reverse. The total resistance of the path of the current flowing through solenoid 32 being thus variably decreased, the flow of current through the solenoid increases, and regulator 31 tends to lower the output voltage of valve 6 to restore the flow of current through solenoid 32 to the normal value thereof corresponding to the particular adjustment of spring 34. Such effect increases in proportion to the magnitude of the flow of current through valves 6 beyond the transition load to gradually increase the responsiveness of regulator 31 to the magnitude of the voltage of line 8. The regulator accordingly imparts to valves 6 a highly drooping voltage characteristic above the transition load. The regulator may also be so adjusted that, at low loads, the voltage of line 8 is maintained at a constant value greater than the maximum voltage obtainable at the transition load. The regulator is then without action for a predetermined range of current values below the transition load, and the characteristic of valves 6 has imparted thereto two discontinuities instead of a single one.

In the embodiment illustrated in Fig. 3, the neutral point of winding 16 is connected with the tap of a voltage divider 44 connected across line 8 to impress on control electrodes 13 a variable potential component equal to an adjustable fraction of the voltage of line 8. Winding 18 is connected with line 7 through a plurality of reactors 46 which also serve to connect line 7, through adjustable resistors 48, with a plurality of reactors 47. The latter reactors are provided for regulating the voltage impressed on winding 18 and normally draw from line 7 current preferably of magnitude insufficient to cause saturation of the core thereof. A variable degree of magnetic saturation may be induced and controlled in such cores by means of saturating windings 49 connected with resistors 19 and 21 through an adjusting rheostat 51. Such connection may also include a rectifying device 52 which may be short circuited by a switch 53. Reactors 47 are preferably so arranged as to draw symmetrical positive and negative half-waves of current from line 7, and also as not to introduce any alternating voltage components in the saturating circuit thereof, as is well known. If it is desired to supply resistor 21 with current from all phases of line 7, transformer 24 may be supplemented by additional transformers 54 and 56 connected with resistor 21 through additional rectifying devices 57 and 58. Resistor 19 may likewise be connected with the several phase conductors of line 7 through a polyphase transformer 59 and through a group of rectifying devices 61.

In operation, assuming switch 53 to be open and the flow of current through valves 6 to be below the transition value, the voltage of resistor 21 is less than the voltage of resistor 19 and the difference between such voltages tends to cause a flow of current through rheostat 51 and windings 49, such flow of current being, however, prevented by rectifier 52. Reactors 47 then draw only a negligible amount of current from line 7, and transformer 17 cooperates with voltage divider 44 in imparting to the system a slightly drooping characteristic or in simply facilitating the operation of valves 6 under the inherent voltage characteristic thereof, depending upon the phase relation of transformers 12 and 17 and upon the adjustment of voltage divider 44. If switch 53 is closed, winding 49 receives current from resistors 19 and 21, such current varying from a maximum value at no load and being zero at the transition load of valves 6. Reactors 47 thus have their cores variably saturated and draw a variable material amount of current from line 7 through reactors 46, thus causing the appearance of a variable voltage drop in such reactors. The voltage impressed on winding 18 is thereby varied, such voltage increasing gradually from no load to the transition load of valves 6, the transformer then cooperating with voltage divider 44 in maintaining the voltage of line 8 substantially constant.

When the current through valves 6 increases beyond the transition load, and regardless of whether or not switch 53 is closed, resistors 19 and 21 supply to windings 49 a current increasing with the flow of current through valves 6, thus gradually saturating the cores of reactors 47. The reactors draw an increasing amount of current from line 7, thus causing an increasing voltage drop in reactors 46. The voltage of transformer 17 is thus gradually decreased in magnitude, and also somewhat shifted in phase, thus gradually retarding the moments of positive energization of control electrodes 13 and gradually decreasing the output voltage of valves 6. The output characteristic of valves 6 is thus again caused to present a discontinuity at the transition load and to become highly drooping for values of current above such transition load. The magnitude and phase of the current drawn by reactors 47 may be varied by adjustment of resistors 48, to thereby adjust the magnitude and phase of the voltage drop produced by such current in reactors 46, and thus adjust the degree of regulation of the voltage of winding 18.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, an alternating current line; a direct current line; an electric valve connected with said lines for controlling the flow of current therebetween and provided with an anode, with an associated control electrode and a cathode; a circuit connecting said control electrode with said cathode including a transformer energized from said alternating current line for impressing an alternating potential component on said control electrode, means including a regulator responsive to the magnitude of the voltage of said direct current line for impressing a variable unidirectional potential component on said control electrode; and means responsive to the magnitude of the flow of current, through said valve above a predetermined limit to vary the degree of response of said regulator.

2. In an electric translating system, an alternating current line; a direct current line; an electric valve connected with said circuits for controlling the flow of current therebetween and provided with an anode, with an associated control electrode and a cathode; a circuit connecting said control electrode with said cathode including a transformer energized from said alternating current line for impressing an alternating potential component on said control electrode, means including a regulator responsive to the magnitude of the voltage of said direct current line for impressing a variable unidirectional potential component on said control electrode; and means for varying the adjustment of said regulator including a source of substantially constant unidirectional voltage, means responsive to the magnitude of the flow of current through said valve for producing a variable unidirectional voltage, and means responsive to the difference between the magnitude of said constant and variable unidirectional voltages.

3. In an electric translating system, an alternating current line; a direct current line; an electric valve connected with said lines for controlling the flow of current therebetween and provided with an anode, with an associated control electrode and a cathode; a circuit connecting said control electrode with said cathode including a transformer energized from said alternating current line for impressing an alternating potential component on said control electrode, means including a regulator responsive to the magnitude of the voltage of said direct current line for impressing a variable unidirectional potential component on said control electrode; and means for varying the adjustment of said regulator including a source of substantially constant unidirectional voltage, means other than said valve responsive to the magnitude of the flow of current through said valve for producing a variable unidirectional voltage, and a connection between said regulator and said direct current line including the said source, the said means other than said valve and an auxiliary electric valve.

4. In an electric translating system, an alternating current line; a direct current line; an electric valve connected with said lines for controlling the flow of current therebetween and provided with an anode, with an associated control electrode and a cathode; a circuit connecting said control electrode with said cathode including an inductive element having a core of saturable material; and means for controlling the core saturation of said element including a source of substantially constant unidirectional voltage, means other than said valve responsive to the magnitude of the flow of current through said valve for producing a variable unidirectional voltage, and means responsive to the difference between the magnitudes of said constant and variable unidirectional voltages.

5. In an electric translating system, an alternating current line; a direct current line; an electric valve connected with said lines for controlling the flow of current therebetween and provided with an anode, with an associated control electrode and a cathode; a circuit connecting said control electrode with said cathode including a transformer energized from said alternating current line for impressing an alternating potential component on said control electrode, a saturable reactor; means for controlling the core saturation of said reactor including a source of substantially constant unidirectional voltage, means other than said valve responsive to the magnitude of the flow of current through said valve for producing a variable unidirectional voltage, and means responsive to the difference between the magnitudes of said constant and variable unidirectional voltages; and a reactor for jointly connecting the first said reactor and the said transformer with said alternating current line.

6. In an electric translating system, the combination with an electric current supply circuit, an electric current load circuit, and electric valve means comprising a cathode and an anode interconnecting said circuits and constituting spaced electrodes for the flow of current therebetween, of means for controlling said flow of current comprising a control electrode constituting an element of the first said means, means for impressing an alternating potential component on said control electrode, means for impressing a unidirectional potential component on said control electrode of magnitude proportionate to the potential of one of said circuits, and means included in the connections of said supply circuit with said valve means operable responsive to the said flow of current above a predetermined magnitude for varying the magnitude of one of said potential components relative to the magnitude of the other thereof, to thereby impart a highly drooping voltage characteristic to said load circuit.

7. In an electric translating system, the combination with an electric current supply circuit, an electric current load circuit, and electric valve means comprising a cathode and an anode constituting spaced electrodes for the flow of current therebetween, of means for controlling said flow of current comprising a control electrode constituting an element of the first said means, means for impressing an alternating potential component on said control electrode, means for impressing a unidirectional potential component on said control electrode of magnitude proportionate to the potential of said supply circuit, and means included in the connections of said supply circuit with said valve operable responsive to the magnitude of said flow of current above a predetermined value for varying the magnitude of the said unidirectional potential component relative to the magnitude of said alternating potential component, to thereby progressively impart a highly drooping voltage characteristic to said load circuit.

8. In an electric translating system, the combination with an electric current supply circuit, an electric current load circuit, and electric valve means comprising a cathode and an anode interconnecting said circuits and constituting spaced electrodes for the flow of current therebetween, of means for controlling said flow of current comprising a control electrode constituting an element of the first said means, means for impressing an alternating potential component on said control electrode, means for impressing a unidirectional potential component on said control electrode of magnitude proportionate to the magnitude of the potential of said load circuit, means for varying the magnitude of the said alternating potential component relative to the potential of said supply circuit, and means included in the connections of said supply circuit with said valve means operable responsive to the magnitude of said flow of current above a predetermined value for varying the magnitude of said alternating potential component, to thereby progressively decrease the magnitude of said flow of current.

9. In an electric translating system, the combination with an electric current supply circuit, an electric current load circuit, and electric valve means comprising a cathode and an anode interconnecting said circuits and constituting spaced electrodes for the flow of current therebetween, of means for controlling said flow of current comprising a control electrode constituting an element of the first said means, means for impressing an alternating potential component on said control electrode, means for impressing a unidirectional potential component on said control electrode proportionate to the potential of said load circuit, means operable responsive to and in dependence on the magnitude of the potential of said supply circuit for varying the magnitude of said unidirectional potential component, and means included in the connections of said supply circuit with said valve means operable responsive to said flow of current above a predetermined magnitude for modifying the operation of the fifth said means, to thereby impart a highly drooping voltage characteristic to said load circuit.

10. In an electric translating system, the combination with an electric current supply circuit, an electric current load circuit, and electric valve means comprising a cathode and an anode interconnecting said circuits and constituting spaced electrodes for the flow of current therebetween, of means for controlling said flow of current in such sense as to impart a highly drooping voltage characteristic thereto upon the occurrence of the flow thereof above a predetermined value comprising a control electrode constituting an element of the said valve means, means for impressing an alternating potential component on said control electrode, means for impressing a unidirectional potential component proportional to the potential of one of said circuits on said control electrode, and means included in the connections of one of said circuits with said valve means for varying the magnitude of one of said components relative to the magnitude of the other of said components.

11. In an electric translating system, the combination with an electric current supply circuit, an electric current load circuit, and electric valve means comprising a cathode and an anode interconnecting said circuits and constituting spaced electrodes for the flow of current therebetween, of means for controlling said flow of current in such a sense as to impart a highly drooping voltage characteristic thereto upon the occurrence of the flow thereof above a predetermined value comprising a control electrode constituting an element of said valve means, means for impressing on said control electrode a potential comprising an alternating component and a unidirectional component, and means operable in dependence upon variations in the magnitude of said flow of current for varying the magnitude of one of said components.

HAROLD WINOGRAD.